Aug. 17, 1926.
J. S. LANG
SHOCK ABSORBER
Filed June 12, 1924
1,596,195
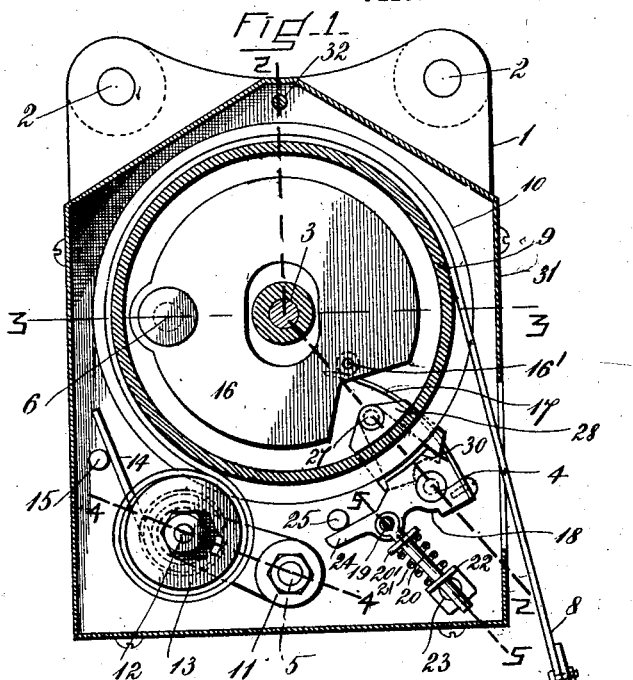
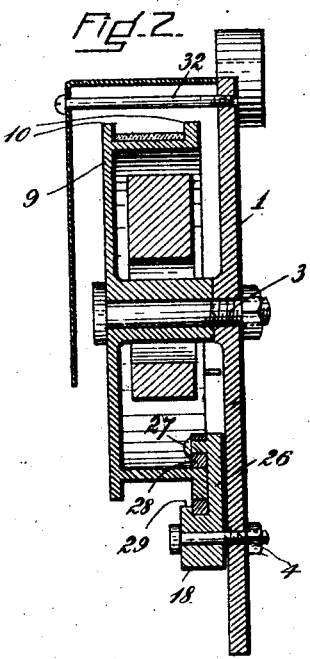
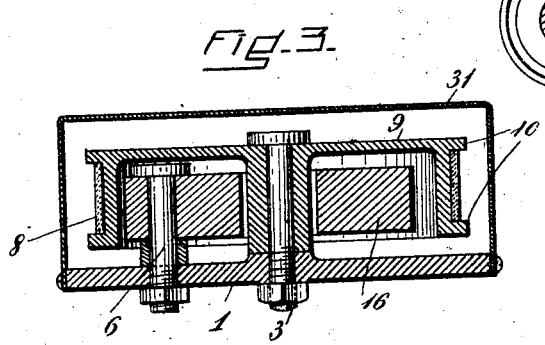
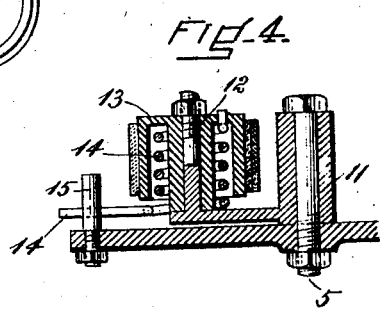
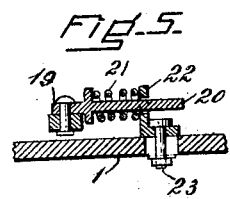
INVENTOR=
James S. Lang
BY
ATTORNEYS=

Patented Aug. 17, 1926.

1,596,195

UNITED STATES PATENT OFFICE.

JAMES S. LANG, OF WATERTOWN, MASSACHUSETTS.

SHOCK ABSORBER.

Application filed June 12, 1924. Serial No. 719,671.

The present invention relates to that class of shock absorbers which are especially adapted for motor or other vehicles, and in which frictional resistance is utilized to prevent excessive vibration or rebound of the vehicle body.

The object of the invention is to provide a generally improved shock absorber embodying means for automatically varying the frictional resistance developed by its mechanism whenever a variation of such resistance is required to effectually check the vibration or rebound of the vehicle body and otherwise provide for a proper control thereof. It is also my object to provide a shock absorber having extreme sensitiveness, and of relatively few parts and low cost.

The invention can readily be adapted to conform to the construction of most absorbers of the frictional type now in use and for purposes of illustration I have shown it applied to an absorber in which the frictional resistance is developed between a flexible strap or band and a relatively stationary curved surface over which the strap is drawn.

The invention can best be seen and understood by reference to the drawings in which an absorber embodying the invention is shown and in which—

Figure 1 is a vertical section of the absorber exposing its interior parts.

Fig. 2 is a section on the line 2—2 of Fig. 1.

Fig. 3 is a section on the line 3—3 of Fig. 1.

Fig. 4 is a section on the line 4—4 of Fig. 1, and

Fig. 5 is a section on the line 5—5 of Fig. 1.

Referring to the drawings:—

1 represents a frame plate which is provided with bolting holes 2 by means of which it may be securely fastened to the body or frame of the vehicle to which it is applied. The frame plate 1 is threaded to receive bearing studs 3, 4, 5 and 6 carrying various working parts to be described. 7 represents the axle of the vehicle to which the absorber is applied and to which one end of a flexible strap 8 is attached. 9 represents a rotatable drum preferably provided with flanges 10 within which the strap 8 may lie. The drum 9 is mounted upon the fixed stud 3 and under certain conditions is rotatable with relative freedom thereon. 11 represents a carrier bracket rotatably mounted upon the fixed stud 5. The bracket 11 bears a secondary stud 12 on which is rotatably mounted a secondary drum 13. The drum 13 is adapted to contain within its hollowed interior a torsion spring 14 one end of which is extended to engage a bearing stud 15 on the plate 1. The strap 8 having one end fastened in any convenient manner to the axle 7, lies within the flanges 10 on the drum 9 and is in firm contact with the face of the latter for the greater part of its circumference and has its other end fastened to the circumferential face of the secondary drum 13, being wrapped about drum 13 with one or more turns in a reverse direction.

With the parts thus arranged, the tension of the spring 14 tends to wind up all slack in the strap 8 upon the secondary drum 13, thus keeping the strap 8 taut at all times. The carrier bracket 11 being rotatably supported upon the stud 5, turns slightly upon the latter as the wrappings of the strap 8 increase upon the circumference of the secondary drum 13, while the reaction of the spring 14 upon the stud 15 presses the strap 8 firmly against the drum 9 between the two drums. If the axle 7 is moved downward away from the vehicle body to which the frame plate 1 is attached, the strap 8 will be unwound from the secondary drum 13, passing over drum 9, moving the latter in a clockwise direction, while drum 13 moves counter-clockwise. Conversely if the axle 7 is moved nearer the vehicle body the strap 8 will be wound up upon the secondary drum 13 which will move in a clockwise direction while the drum 9 moves in a counter-clockwise direction. During both these movements there will be no slipping of the strap 8 upon the surface of the drums, and the energy expanded will be only that required to overcome the tension of the spring 14 and the friction resulting from the pressure between the two drums.

16 represents a weight located within the hollowed interior of the drum 9. The weight is pivotally hung upon the stud 6 as a bearing, and is capable of oscillation thereon. The weight carries upon one side a pin 16' or other suitable projection which rests upon the side of a flat spring 17 securely fastened to a clutch member 18. The clutch member 18 is hung with a limited range of oscillation upon the stud 4. Attached to the clutch member 18 by a pivot 19 is a spring carrier 20 carrying a spring 21. The spring carrier 20 has a shoulder 20' which provides a bearing for one end of the spring 21, while the other end of the spring rests with considerable tension against a carrier guide 22 through which the spring carrier extends with rather a loose fit and which is fastened to the plate 1 by a clamping bolt 23. To provide a means for adjusting the tension of the spring 21 the frame plate 1 is slotted permitting adjustment of the clamping bolt 23 and positioning of the carrier guide 22 in different adjusted positions. Oscillation of the clutch member 18 is limited in one direction by the end 24 thereof coming into contact with a pin or stop 25 on the plate 1. In its normal position as shown the projection 24 is in close proximity to or in actual contact with the stop 25 as desired, which is attained by the adjustment of the carrier guide 22.

With this arrangement of parts the weight 16, pivotally hung upon the stud 6, is supported in a state of substantial balance by means of the spring 17, the clutch member 18, the spring carrier 20 and the spring 21 upon the carrier guide 22. When the weight 16 is depressed its motion is transmitted with relatively little loss by means of the stiff spring 17 to the clutch member 18, which is turned upon the stud 4 in a counter-clockwise direction compressing the spring 21, and the projecting end 24 of the clutch member 18 is moved farther away from the stop 25. Movement of the weight 16 above its normal position by action of the spring 21 will be prevented by the stop 25.

The clutch member 18 is provided with an arm 26 arranged to pass within the circumferential line of the drum 9. Rotatably fastened to this arm by a pin 27 is a clutch shoe 28 having a friction face conforming to the interior curvature of the drum 9 and adapted to come into contact therewith. Pocketed within the space between the arm 26 of the clutch member and a projecting lip 29 thereon is a second clutch shoe 30 having a friction surface conforming to the exterior curvature of the flange or face of the drum 9 and adapted to come into contact therewith. The shoe 30 while securely retained in the socket provided for it, is capable of a slight rotation or movement therein. The arrangement of the shoes 28 and 30 borne by the clutch member 18 is such that when the clutch member is in its normal position as shown no pressure is exerted by the shoes upon the surfaces of drum 9 and the latter is free to rotate in both directions. When, however, the clutch member 18 is turned in a counter-clockwise direction upon the stud 4, the shoe 28 will be pressed against the inside of the flange or face of the drum 9 and the shoe 30 against the outside of the drum. If the clutch member 18 is turned to bring the shoes into engagement with the drum 9 while the drum is being rotated in a clockwise direction, the friction developed between the drum and shoes will tend to draw the latter into still closer engagement with the drum securely locking the shoes upon the drum and preventing its further rotation. If the clutch member is turned to bring the shoes into engagement with the drum 9 while the drum is being rotated in a counter-clockwise direction the friction developed between the drum and shoes will oppose the movement of the clutch member, and no locking of the drum will take place.

It is thus seen that when the weight 3 is in its normal position the drum 9 may be freely rotated in either direction, and when weight 3 is depressed sufficiently below its normal position to turn the clutch member 18 rotation of the drum 9 in one direction only is possible.

To protect the working parts from dirt, dust and water, a sheet metal cover 31 is provided which is securely fastened to the frame plate 1 by screws 32.

The operation of the absorber is as follows:—

It will be assumed that all the parts of the shock absorber are in normal position, the weight 16 being supported in substantial balance upon the spring 21 with clutch member 18 resting against or in close proximity to the stop 25, the clutch member then being in its released position, and that the vehicle with its axle in normal relation to the body encounters a road surface having a large number of small inequalities, not in themselves sufficient to cause a rebound. In passing over these inequalities the axle is vibrated rapidly up and down, as it follows the contour of the ground with a small range of movement. During these movements each time the axle approaches the body of the vehicle a portion of the strap 8 is wound upon the drum 13 through the action of the spring 14, the strap passing over drum 9 which in turning is opposed by its own axis friction only. Each time the axle moves away from the body of the vehicle a portion of the strap 8 is unwound from the drum 13 putting an increased tension upon spring 14, the strap passing over drum 9 which in turning is opposed by its own axis friction only. It is thus seen that the vibration of the vehicle axle takes place freely except for the slight resistance of the spring 14 and the friction developed at the axles of the drums 9 and 13. During these movements the friction developed at the axles of the drums has a slight dampening effect upon any slight vibration which might occur.

It will now be assumed that the vehicle encounters a raised obstruction in the roadway having an abrupt rise succeeded by a corresponding decline and of sufficient height and width under ordinary circumstances to produce a violent rebound. The vehicle and shock absorber with it reaches the obstruction with all its parts as before in substantially normal positions, and as the wheels mount the rise the axle is brought nearer to the body of the vehicle, compressing the vehicle springs. Simultaneously with the rise of the axle the spring 14 winds up a portion of the strap 8 upon drum 13, the strap passing over drum 9 which turns with it overcoming the resistance of its own axis friction. If, as assumed above, the approach is quite abrupt, followed by an immediate decline, the inertia of the vehicle body will prevent its appreciable rise until the wheels have reached the top of the obstruction, when an incipient rebound will begin. The vehicle body then rises slightly from its line of travel, and simultaneously the axle begins to move away from the body as the wheels pass the horizontal crown, unwinding the strap 8 from the drum 13, and drawing it over the drum 9. During the movement of the axle away from the body, however, there occurs a slight rise of the vehicle body from its normal line of travel, which causes the weight 16 to become depressed by reason of its inertia compressing springs 17 and 21, turning the clutch member and bringing its shoes 28 and 30 into contact with the clutching surfaces of the drum 9. As the movement of the drum at this time is clockwise, the shoes will become locked upon the drum as soon as material contact therewith is made, and further movement of the drum in that direction is prevented, with the result that the further expansion of the vehicle springs is opposed by the heavy friction developed by the necessary drawing of the strap 8 over the stationary drum 9, thus preventing the rebound.

An example, the opposite to the preceding, will now be considered, in which the vehicle passes a wide and deep depression in the roadway.

The vehicle and shock absorber with it approaches as before with all its parts in substantially normal positions. Due to the inertia of the vehicle body when the wheels go into the depression, the axle moves down and away from the vehicle body. As this movement takes place the descending axle draws the strap 8 over drum 9 which turns in unison with the strap upon its circumference and in so turning overcomes the friction developed at the axis of the drum. As the wheels go into the hollow, however, the vehicle body is deprived of some portion of its support from the vehicle springs and falls slightly from its normal line of travel. This causes the weight 16 to rise slightly with reference to the frame plate 1 with no effect upon the clutch member except permitting it to occupy a more released position and in any event causing it to remain in its normal released position. This permits the vehicle springs to expand beyond their normal state of compression without undue resistance thus maintaining the vehicle body well up in position while passing the hollow. As the wheels mount the rise on the opposite side of the depression the axle approaches the body and the vehicle springs regain their normal state of compression restoring their support to the body, and as the body had previously fallen slightly, they are compressed slightly above normal when the wheels reach the level. While the wheels are mounting the rise the spring 14 winds up the strap 8 upon the drum 13 overcoming the axis friction of both drums which presents no added resistance to the compression of the vehicle springs. During this movement the weight 16 will be depressed on account of its inertia, but as the drum 9 is moving in a counter-clockwise direction the friction developed at the clutch shoes 28 and 30 opposes the tendency of the clutch to lock permitting the drum 9 to revolve. When, however, the wheels have reached the level roadway beyond the hollow and a rebound commences, the strap 8 and drum 9 begin to move in the other direction and the drum 9 is immediately locked thus stopping any further rebound.

Having thus fully described my invention, I claim and desire to secure by Letters Patent of the United States:—

1. A shock absorber for controlling the movement of relatively movable parts comprising a rotary friction member connected to one of said parts and a flexible strap connected to the other of said parts and extended over said rotary friction member, a take-up for the end of said strap, a weighted member, means for supporting said weighted member to normally occupy a certain position with relation to said rotary friction member or, by reason of its inertia, a relatively changed position with relation to said friction member when said weighted member is subjected to a disturbing influence, and means acted upon by said weighted member for impeding the movement of said rotary friction member.

2. A shock absorber for controlling the movement of relatively movable parts comprising a rotary friction member connected to one of said parts and a flexible strap connected to the other of said parts and extended over said rotary friction member, a take-up for the end of said strap, a weighted member, means for supporting said weighted member to normally occupy a certain position with relation to said rotary friction member or, by reason of its inertia, a relatively changed position with relation to said friction member when said weighted member is subjected to a disturbing influence, a clutch adapted to have engagement with said rotary friction member for impeding the rotation thereof in one direction when the clutch is occupying an engaging position, and means whereby said clutch may be thrown into an engaging position by said weighted member when occupying its changed position as aforesaid.

3. In a device of the character set forth, an oscillating drum actuated by approach or separation of axle and chassis, a braking device to retard the oscillation of said drum and an inertia means to cause said breaking device to act with varying pressures on said drum.

4. In a device of the character set forth, an oscillating drum actuated by approach and separation of axle and chassis, a restraining device and means to cause said restraining device to act upon said drum with differential forces depending upon the relations existing between the vertical acceleration of the chassis and movements of approach or recession between the chassis and axle.

5. In a shock absorber for vehicles, a balanced actuating member, and means to restrain relative movement of chassis and axle of the vehicle operated upon displacement of said actuating member from its normal balanced position, said restraining means comprising a brake band and an oscillatory drum with which said brake band contacts.

6. In a shock absorber adapted to control the motion of a spring mounted body, a balanced actuating member, and means to restrain movement of the body relative to its support operated upon displacement of the actuating member from its normal balanced position, said restraining means comprising a brake band and an oscillatory drum with which said brake band contacts.

JAMES S. LANG.